United States Patent
Fugel et al.

(10) Patent No.: US 8,926,191 B2
(45) Date of Patent: Jan. 6, 2015

(54) AXIAL CAGE FOR CYLINDRICAL ROLLING ELEMENTS

(75) Inventors: Wolfgang Fugel, Nürnberg (DE); Andreas Kirschner, Aurachtal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 31 days.

(21) Appl. No.: 13/637,704

(22) PCT Filed: Apr. 5, 2011

(86) PCT No.: PCT/EP2011/055233
§ 371 (c)(1),
(2), (4) Date: Dec. 17, 2012

(87) PCT Pub. No.: WO2011/138108
PCT Pub. Date: Nov. 10, 2011

(65) Prior Publication Data
US 2013/0089286 A1    Apr. 11, 2013

(30) Foreign Application Priority Data
May 3, 2010    (DE) .......................... 10 2010 019 069

(51) Int. Cl.
| F16C 33/54 | (2006.01) |
| F16C 19/30 | (2006.01) |
| F16C 33/46 | (2006.01) |
| F16C 33/66 | (2006.01) |

(52) U.S. Cl.
CPC ................. *F16C 33/54* (2013.01); *F16C 19/30* (2013.01); *F16C 33/4682* (2013.01); *F16C 33/546* (2013.01); *F16C 33/6681* (2013.01)
USPC ....................................................... 384/623

(58) Field of Classification Search
CPC ............................ F16C 33/4682; F16C 33/546
USPC .......................................................... 384/623
See application file for complete search history.

(56) References Cited

U.S. PATENT DOCUMENTS 2,978,282 A * 4/1961 Fisher ........................ 384/623
3,240,542 A   3/1966 Jahn ............................. 308/235

(Continued)

FOREIGN PATENT DOCUMENTS

| CN | 101600891 A | 12/2009 |
| DE | 1174113 B   | 7/1964  |

(Continued)

OTHER PUBLICATIONS

International Search Report issued in connection with International Application No. PCT/EP2011/055233, on Jun. 28, 2011.

(Continued)

*Primary Examiner* — Thomas R. Hannon
(74) *Attorney, Agent, or Firm* — Fitzpatrick, Cella, Harper & Scinto

(57) ABSTRACT

An axial cage for cylindrical rolling elements includes an annular disc, the disc having a W-shaped profile cross-section and including a radially inner rim, a radially outer rim, and a U-shaped bead connected via straight profile sections to the rims. Rectangular cage pockets are worked out of the bead and the adjoining straight sections, between which are pocket webs that connect the rims to one another and hold cylindrical rolling elements in the cage pockets. The outer rim has a crown cap-like overall shape such that it includes, in the region of each cage pocket, a constriction that extends axially into the cage pocket and is in supporting contact with an end face of the rolling elements, and, in the region of each pocket web, a section corresponding to the outer diameter of the axial cage.

2 Claims, 4 Drawing Sheets

(56) References Cited

U.S. PATENT DOCUMENTS

| | | | |
|---|---|---|---|
| 3,298,761 A | | 1/1967 | Schaeffler |
| 3,442,562 A | | 5/1969 | Schaeffler et al. |
| 4,192,560 A | * | 3/1980 | Hartnett .................. 384/572 |
| 5,391,005 A | | 2/1995 | Alling |
| 5,826,988 A | | 10/1998 | Furukawa et al. |
| 6,007,254 A | | 12/1999 | Fujioka et al. |
| 6,206,576 B1 | * | 3/2001 | Wiehl ..................... 384/575 |
| 6,648,519 B2 | | 11/2003 | Fugel et al. |
| 7,210,854 B2 | | 5/2007 | Ince et al |
| 7,419,307 B2 | | 9/2008 | Winzeler et al. |
| 8,627,570 B2 | * | 1/2014 | Takamizawa ............. 384/623 |
| 2002/0181821 A1 | | 12/2002 | Fugel et al. |
| 2005/0254742 A1 | | 11/2005 | Shibano et al. |
| 2007/0280575 A1 | | 12/2007 | Obayashi et al. |
| 2009/0003751 A1 | | 1/2009 | Auffahrt |
| 2009/0215583 A1 | | 8/2009 | Urakami et al. |
| 2010/0278471 A1 | | 11/2010 | Oishi et al. |
| 2010/0322549 A1 | | 12/2010 | Brown et al. |
| 2011/0229067 A1 | * | 9/2011 | Brown et al. ............. 384/623 |

FOREIGN PATENT DOCUMENTS

| | | |
|---|---|---|
| DE | 1 174 113 B | 7/1967 |
| DE | 101 43 089 A1 | 3/2003 |
| DE | 10 2008 026 562 A1 | 12/2009 |
| EP | 1262256 A1 | 12/2002 |
| EP | 2 098 738 A1 | 9/2009 |
| EP | 2 103 825 A1 | 9/2009 |
| JP | 2006-153200 A | 6/2006 |
| JP | 2006-242199 A | 9/2006 |

OTHER PUBLICATIONS

Chinese Office Action dated Jun. 16, 2014, in Chinese Patent Application No. 201180022300.4.

* cited by examiner

AXIAL CAGE FOR CYLINDRICAL ROLLING ELEMENTS

FIELD OF THE INVENTION

The invention concerns an axial cage for cylindrical rolling elements according to the generic features of claim 1, and the invention is in particular advantageously realisable in axial needle roller cages.

BACKGROUND OF THE INVENTION

The document DE 1 174 113 B1 discloses a generic axial cage for an axial needle roller bearing that consists substantially of a thin-walled annular disc having a W-shaped profile cross-section, the individual profile limbs of which are formed by a radially inner rim that is integrally formed on the inner edge of the annular disc, by a radially outer rim that is integrally formed on the outer edge of the annular disc and by a U-shaped bead which is connected via straight profile sections to the rims and has the same radial extension as the rims. A plurality of rectangular cage pockets arranged at uniform distances apart from each other is recessed out of the bead, between said cage pockets are formed pocket webs that connect the rims to each other through which pocket webs, the cylindrical rolling elements configured as bearing needle rollers are retained in the cage pockets and guided in circumferential direction.

However, it is sufficiently known from practice that a so-called needle boring caused by centrifugal forces acting on the bearing needle rollers occurs in such axial cages during bearing operation. Due to this needle boring, the bearing needle rollers come with their outer end faces into frictional contact with the corner radii of their cage pockets. Due to this frictional contact, the corner radii, provided at these points with a view to enhancing the shearing strength and the shape stability of the axial cage, work or wear out little by little till, finally, the axial cage breaks or fails prematurely.

For avoiding such a premature failure of the axial cage caused by needle boring, DE 101 43 089 A1 therefore proposes to configure the inner and/or outer rim of the axial cage in such a way that the rim comprises a circumferential vaulted portion in the transition region to the straight profile sections and merges with a circumferential constriction in the region of its free profile end. This circumferential constriction protrudes into the cage pockets and is in supporting contact with the end faces of the bearing needle rollers at two points of contact such that the bearing needle rollers can no longer run against the corner radii of the cage pockets under the influence of centrifugal forces.

In this solution which in itself is very advantageous, it has been determined, however, that it can be realised from the production point of view only with additional expense or with a completely modified method technology. The usual method technology for manufacturing an axial cage without chip removal consists, as known, of the steps of making the axial cage out of an endless sheet metal strip in a plurality of work steps using a stepped punching and drawing tool in which, at first, the rims are worked into the sheet metal strip, followed by punching out the cage pockets and the inner diameter of the axial cage, then forming the bead integrally between the rims and finally also punching out the outer diameter of the axial cage. At the end of the individual work steps, the completed axial cage is still connected to the sheet metal strip merely through two lateral retaining webs formed on its outer rim, from which the axial cage is separated in a last work step. However, if, as is the case in the described solution, this rim comprises a circumferential constriction that merges into a circumferential vaulted region, it is not possible, due to the vaulted region arranged under the retaining webs, to separate the completed axial cage from the lateral retaining webs directly at the rim because, otherwise, a damaging of the vaulted region has to be expected. Separation of the axial cage from the retaining webs must therefore be performed at the inner rim of the sheet metal strip, so that the retaining webs are at first still present on the separated axial cage and must be removed separately at a high cost. Another method of manufacturing the described axial cage would be to make it out of separate sheet metal circular blanks. This method, however, necessitates complex and expensive transportation devices that transport the circular sheet metal blanks further from one work step to the other, so that for this very reason the costs of this manufacturing method are disadvantageously raised.

Another possibility of avoiding the described disadvantageous needle boring in an axial cage has been additionally disclosed in EP 2 103 825 A1. This document proposes forming, within the cage pockets on the straight profile sections arranged between the rims of the axial cage, two wedge-shaped sheet metal lugs on each rim side. When centrifugal forces act on the bearing needle rollers, said wedge-shaped lugs come into supporting point contact with the end faces of the bearing needle rollers at the level of their central longitudinal axes.

A solution of the aforesaid type has, however, also proved to be disadvantageous because the wedge-shaped sheet metal lugs are arranged on the straight profile sections and these straight profile sections usually form the deepest plane of the axial cage. In order to be able to raise the straight profile sections structurally to the level of the central longitudinal axes, the rims of the axial cage must comprise a radial extension in opposite direction to the cage webs which get formed by reason of the worked-in bead. This, however, again has a detrimental effect on the overall stability of the axial cage and likewise additionally creates technical manufacturing problems because, after separation from the sheet metal strips, such axial cages are usually collected in collecting boxes for transportation to the final finishing station. By reason of the pocket webs which protrude freely from the straight profile sections in opposite direction to the rims, the danger arises that the axial cages get entangled with one another in the collecting boxes through their pocket webs. This can therefore only be avoided with the provision of additional stacking devices that likewise add to the manufacturing costs of such axial cages.

OBJECT OF THE INVENTION

Keeping in mind the above-described drawbacks of the solutions of the known State of the Art, the invention has the object of conceiving an axial cage for cylindrical rolling elements with which the known needle boring and its concomitant problems can be avoided and, at the same time, a cost-effective manufacturing with the described, usual method technology is enabled without technical manufacturing problems.

DESCRIPTION OF THE INVENTION

According to the invention, the above object is achieved with an axial cage for cylindrical rolling elements wherein the outer rim of the axial cage is configured with a crown cap-like overall shape, as a result of which, in the region of each cage pocket, the rim comprises a constriction that extends axially into the cage pocket and is in supporting contact with an end face of the rolling elements and, in the region of each pocket web, the rim has a section corresponding to the outer diameter of the axial cage.

The invention is therefore based on the knowledge that the crown cap-like configuration of the outer rim of the axial cage makes it possible, without modifications to the proven W-profile of the axial cage, on the one hand, by reason of the partial constrictions of the outer rim that come into supporting contact with the end faces of the rolling elements to effectively avoid a needle boring within the axial cage and, on the other hand, at the same time, to manufacture the axial cage with the cost-effective method technology out of a sheet metal strip because the sections of the outer rim corresponding to the outer diameter of the axial cage are suited for integrally forming the lateral retaining webs to the sheet metal strip as also for separating the completed axial cage from these retaining webs directly at the outer rim.

Preferred features and developments of the axial cage configured according to the invention will be described in the dependent claims, Thus, in the axial cage configured according to the invention, the constrictions of the outer rim in a preferred first form of embodiment have a conical profile cross-section and are in supporting contact with the end faces of the rolling elements at the level of the central longitudinal axes of the rolling elements. Through the conical configuration of the constrictions a simple point contact with the end faces of the rolling elements is realised, and this point contact has proved to be of a particularly low-friction nature.

A further feature of the axial cage configured according to the invention is that the constrictions of the outer rim in an alternative, second form of embodiment are configured with a radially straight profile cross-section and are in supporting contact with the end faces of the rolling elements at the level of the central vertical axes of the rolling elements. The radially straight configuration of the constrictions requires less work expenditure and, due to the concavity of the constrictions, enables the realisation of a simple linear contact with the end faces of the rolling elements, which has likewise proved to be of a particularly low-friction nature.

A further characteristic feature of the axial cage configured according to the invention is that the corner radii of the cage pockets on the side of the outer rim are enlarged by a measure corresponding to the measure with which the constrictions protrude into the cage pockets. This has proved to be particularly advantageous in the sense that this enables a considerable reduction of the notch effect in this region as well as an enhancement of the overall stability of the axial cage.

Finally, a further advantageous feature of the axial cage configured according to the invention is to configure the sections of the rim which correspond to the outer diameter of the axial cage with additional radial recesses. These additional recesses serve to improve the oil discharge out of an axial bearing comprising the axial cage when this axial bearing is used in a mechanical transmission of an automotive vehicle and lubricating oil flows through the bearing.

BRIEF DESCRIPTION OF THE DRAWINGS

The axial cage configured according to the invention will now be described more closely in the following with reference to a number of preferred forms of embodiment and to the appended figures which show.

DETAILED DESCRIPTION OF THE DRAWINGS

Figure 1:
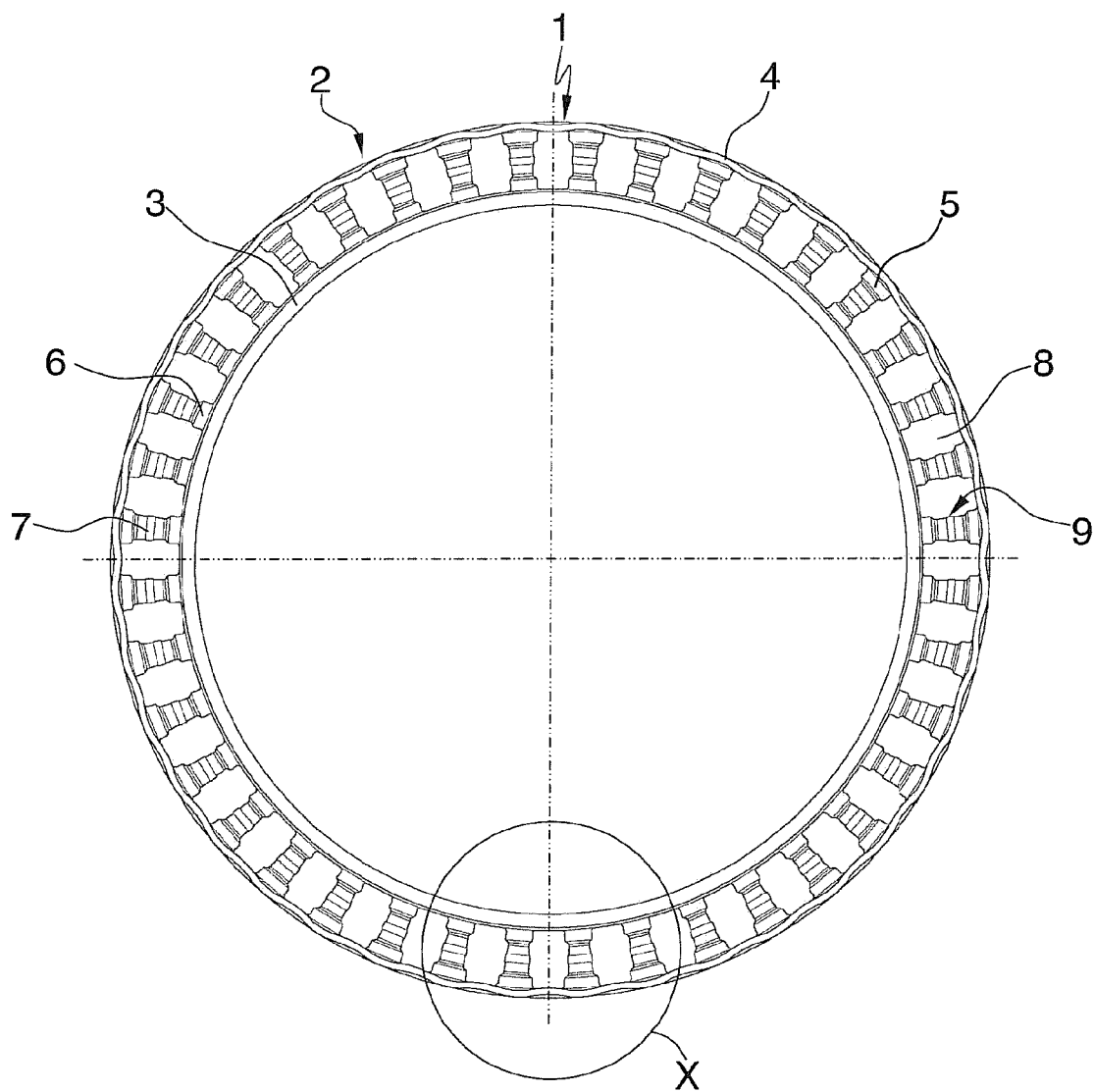
FIG. 1, an overall view of the axial cage configured according to the invention for an axial needle roller bearing.
Figure 4:
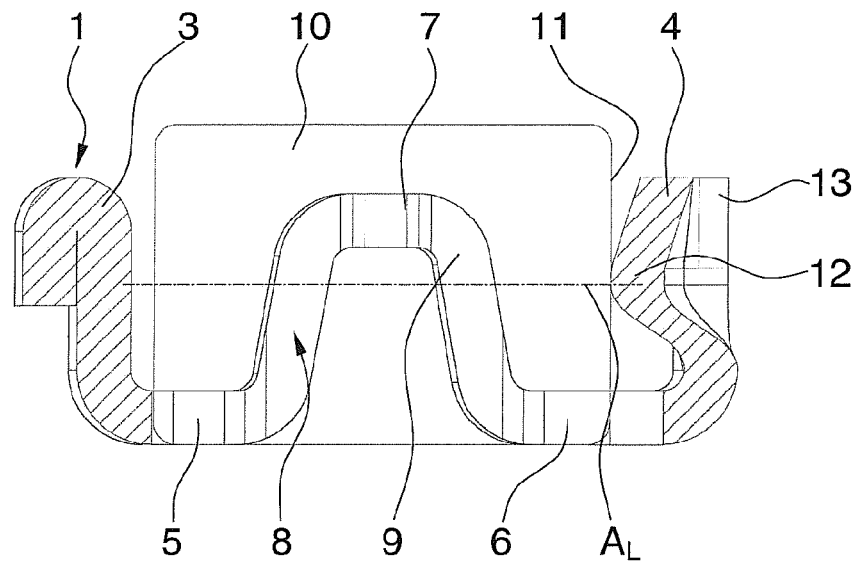
FIG. 4, the section A-A according to FIG. 2 taken through the first form of embodiment of the axial cage configured according to the invention.
Figure 5:
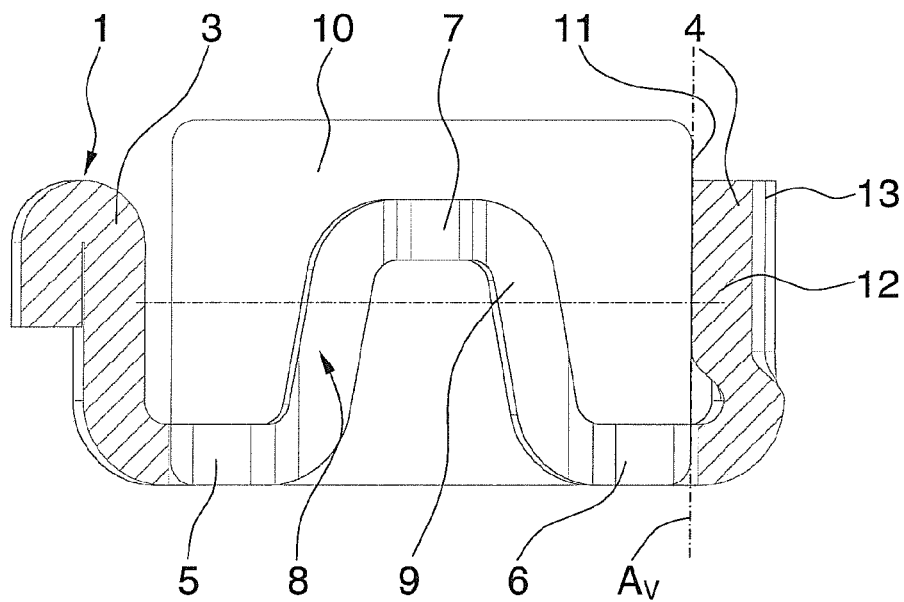
FIG. 5, the section B-B according to FIG. 3 taken through the second form of embodiment of the axial cage configured according to the invention.

FIG. 1 clearly discloses an axial cage 1 suitable for use in an axial needle roller bearing, which cage is made substantially out of a thin-walled annular disc 2 and which, as shown in FIGS. 4 and 5, possesses a W-shaped profile cross-section. It can likewise be seen in FIGS. 4 and 5 that the individual profile limbs of the axial cage 1 are formed by a radially inner rim 3 formed integrally on the inner edge of the annular disc 2, by a radially outer rim 4 formed integrally on the outer edge of the annular disc 2, and by a U-shaped bead 7 that is connected through straight profile sections 5, 6 to the rims 3, 4 and has the same radial extension as the rims 3, 4. Looking at FIG. 1 one can further see clearly that a plurality of uniformly spaced, rectangular cage pockets 8 are recessed out of the bead 7 and the adjoining straight sections 5, 6, between which cage pockets 8, cage webs 9 connecting the rims 3, 4 to each other are formed, and said cage webs 9 retain the cylindrical rolling elements 10 configured as bearing needle rollers in the cage pockets 8 and guide these in circumferential direction.

Figure 2:
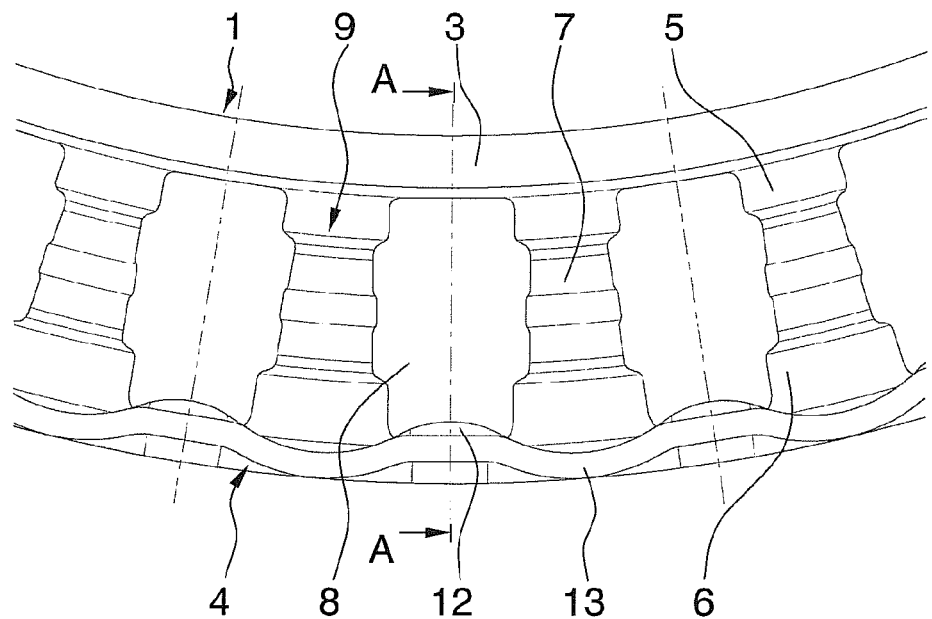
FIG. 2, the detail X of FIG. 1 showing a first form of embodiment of the axial cage configured according to the invention.
Figure 3:
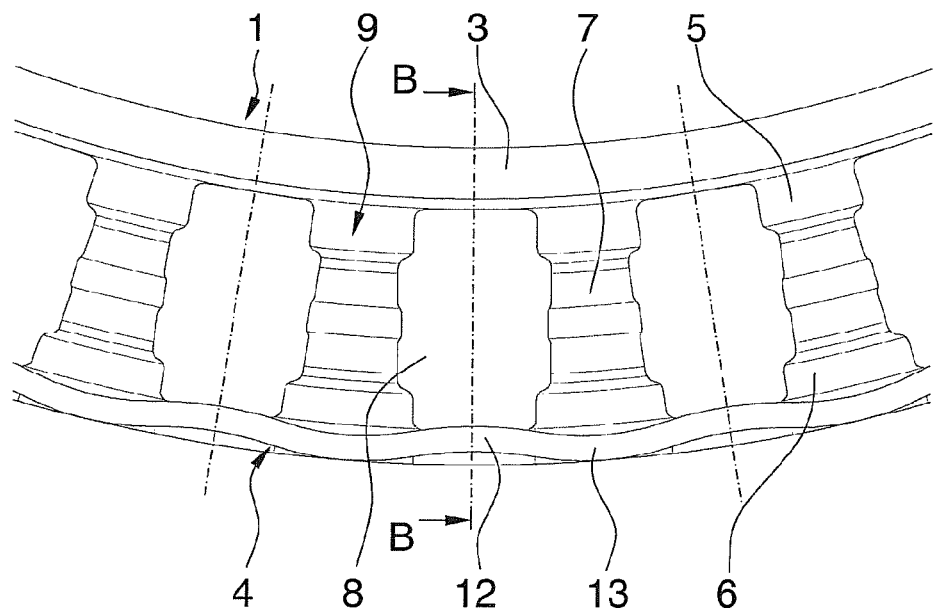
FIG. 3, the detail X of FIG. 1 showing a second form of embodiment of the axial cage configured according to the invention.

In addition, FIGS. 2 and 3 show that the outer rim 4 of the axial cage 1 is configured according to the invention with a crown cap-like overall shape by reason of which the outer rim 4 comprises, in the region of each cage pocket 8, a constriction 12 that protrudes axially into the cage pocket 8 and is in supporting contact with one end face 11 of the respective rolling element 10, and the outer rim 4 is configured, in the region of each cage web 9, with a section 13 that corresponds to the outer diameter of the axial cage 1. From the sections A-A and B-B of FIGS. 2 and 3 shown in FIGS. 4 and 5, it becomes clear that the constrictions 12 of the outer rim 4 are configured either with a conical profile cross-section and are then in point contact with the end faces 11 of the rolling elements 10 at the level of the central longitudinal axes $A_L$ of the rolling elements 10 or, alternatively, they are configured with a radially straight profile cross-section and are then in linear contact with the end faces 11 of the rolling elements 10 at the level of the central vertical axes $A_V$ of the rolling elements 10.

Figure 6:
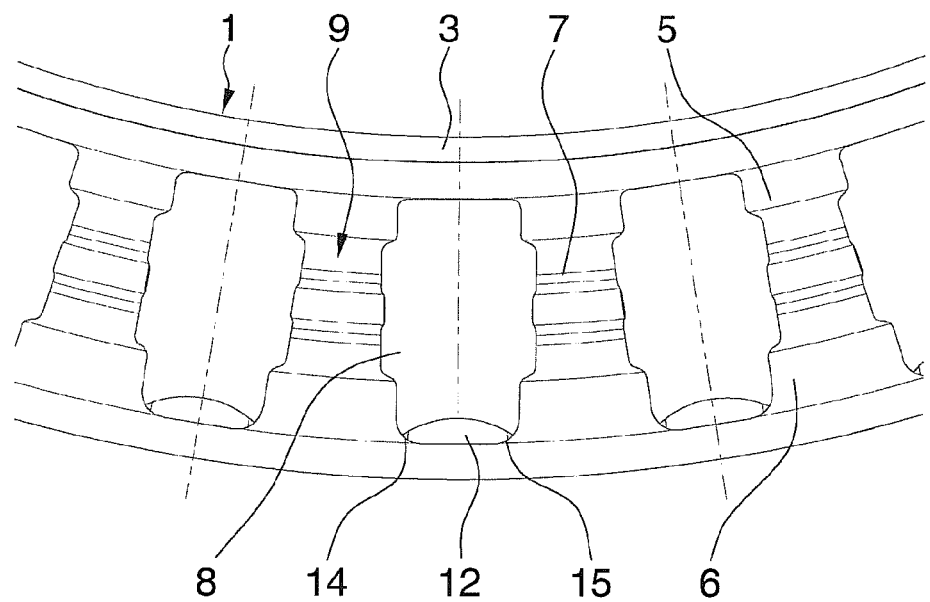
FIG. 6, a view showing the underside of the illustration of the axial cage configured according to the invention shown in FIG. 2.

It can further be seen in the illustration of FIG. 6 that by reason of the constrictions 12 on the outer rim 4 of the axial cage 1, it is possible, irrespective of the conical or radially straight configuration of the constrictions, to enlarge the corner radii 14, 15 of the cage pockets 8 on the side of the outer rim 4 in keeping with the measure by which the constrictions 12 protrude into the cage pockets 8 and to thus achieve a considerable reduction of the notch effect in this region of the axial cage 1 as well as an enhancement of the overall stability of the axial cage 1.

Figure 7:
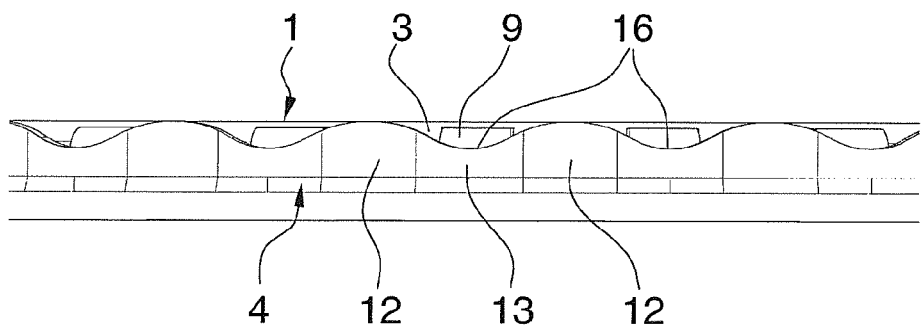
FIG. 7, a front view of the illustration of FIG. 3 showing an optional variation of the axial cage configured according to the invention.

Finally, from FIG. 7 it is further clear that the sections 13 of the rim 4 corresponding to the outer diameter of the axial cage 1 are configured with additional radial recesses 16 in order to improve the oil discharge out of an axial needle roller bearing comprising the axial cage 1 and used in a mechanical transmission of an automotive vehicle, so that so-called splashing friction losses can be avoided.

LIST OF REFERENCE NUMERALS

1 Axial cage
2 Annular disc
3 Inner rim
4 Outer rim
5 Straight profile section
6 Straight profile section
7 Bead
8 Cage pockets
9 Pocket webs
10 Rolling elements
11 End faces of 10
12 Constrictions on 4
13 Sections on 4
14 Corner radius of 8
15 Corner radius of 8
16 Recesses in 13
$A_L$ Central longitudinal axis of 10
$A_V$ Central vertical axis of 10

The invention claimed is:

1. An axial cage for cylindrical rolling elements, comprising:
   an annular disc having a W-shaped profile cross-section, wherein said annular disc includes:
      a radially inner rim that is integrally formed on an inner edge of said annular disc,
      a radially outer rim that is integrally formed on an outer edge of said annular disc, and
      a U-shaped bead which is connected via straight profile sections to the inner and outer rims and has the same radial extension as the rims; and
   a plurality of uniformly spaced, rectangular cage pockets recessed out of the bead and the adjoining straight profile sections,
   wherein pocket webs are formed between said cage pockets, the pocket webs connecting the rims to each other and being configured to retain cylindrical rolling elements in said cage pockets and guide the retained cylindrical rolling elements in a circumferential direction,
   wherein said outer rim is configured with a crown cap-like overall shape such that the outer rim includes, in the region of each cage pocket, a constriction that extends axially into the cage pocket and is in supporting contact with an end face of the cylindrical rolling elements, and includes, in the region of each pocket web, a section corresponding to the outer diameter of the axial cage, and
   wherein the constrictions of the outer rim are configured with a radially straight profile cross-section and are in linear contact with the end faces of the cylindrical rolling elements at the level of the central vertical axes of the rolling elements.

2. An axial cage according to claim 1, wherein the sections of the outer rim which correspond to the outer diameter of the axial cage are configured with radial recesses for discharging oil out of an axial bearing comprising the axial cage.

* * * * *